May 10, 1949.   J. D. WHEELER   2,470,061
WAGON
Filed Jan. 7, 1947   2 Sheets-Sheet 1
FIG. 1
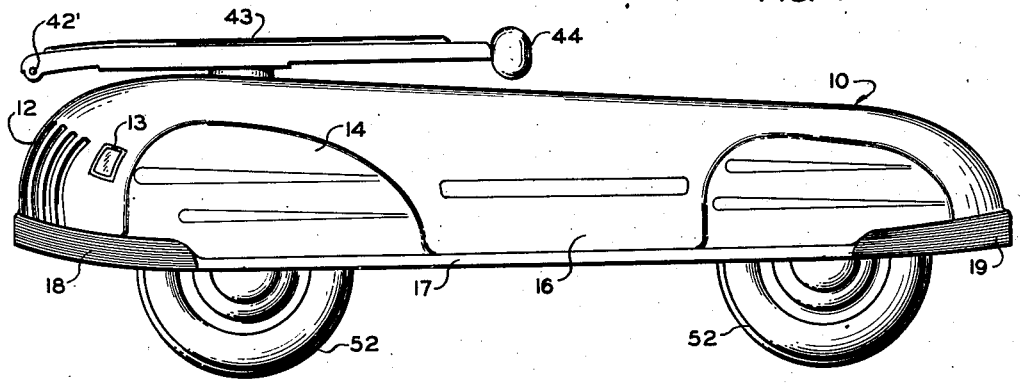
FIG. 3
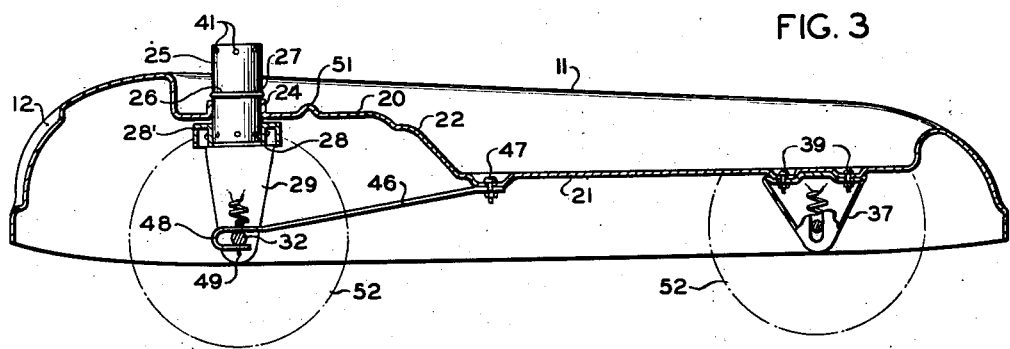
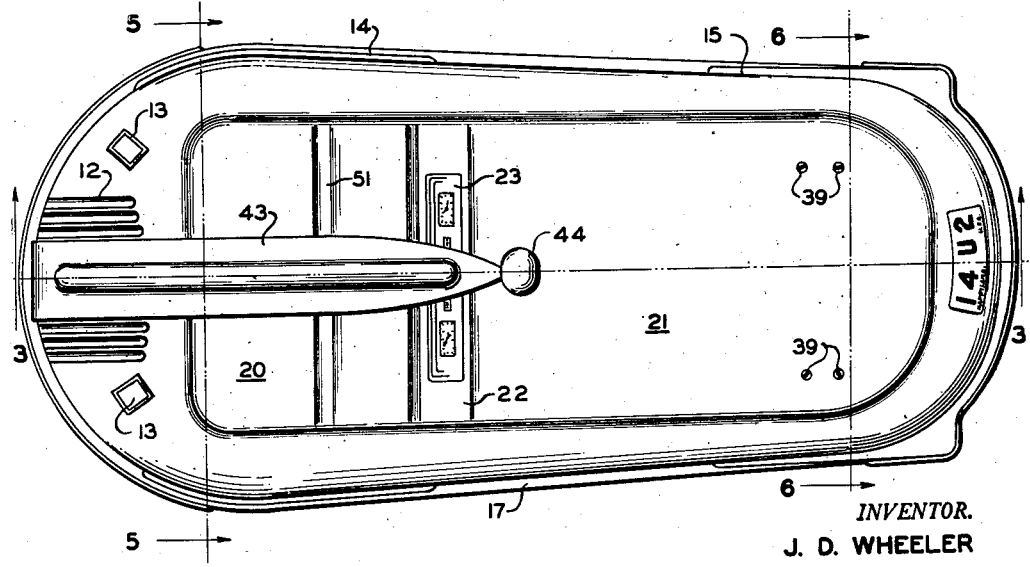
FIG. 2
INVENTOR.
J. D. WHEELER
BY
A. Yates Dowell
ATTORNEY May 10, 1949.    J. D. WHEELER    2,470,061
WAGON
Filed Jan. 7, 1947    2 Sheets-Sheet 2
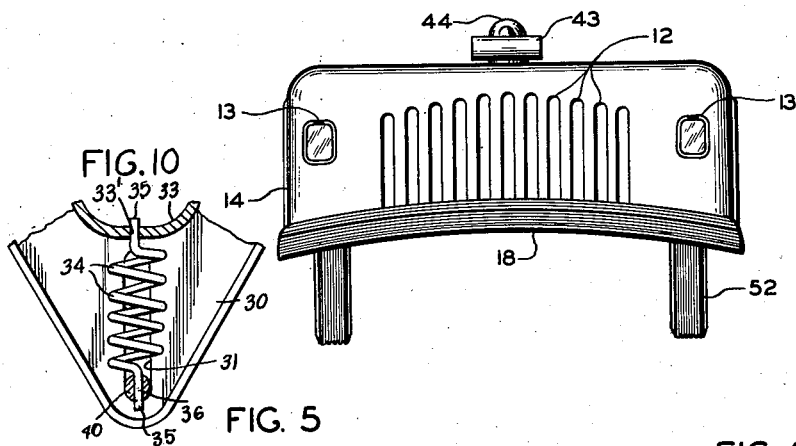
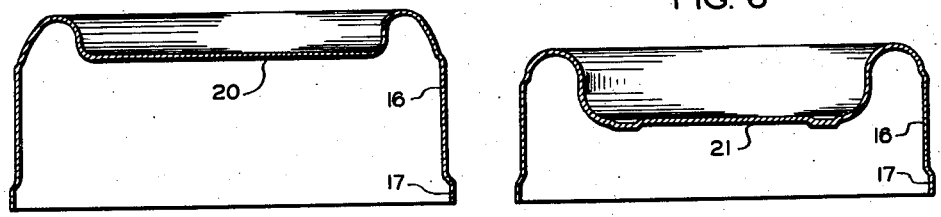
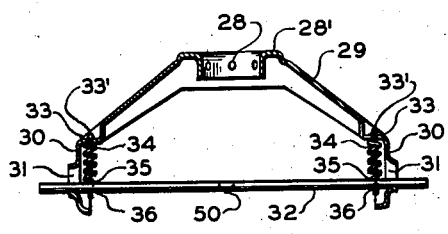
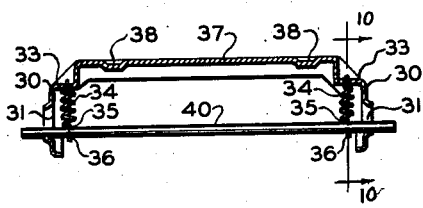
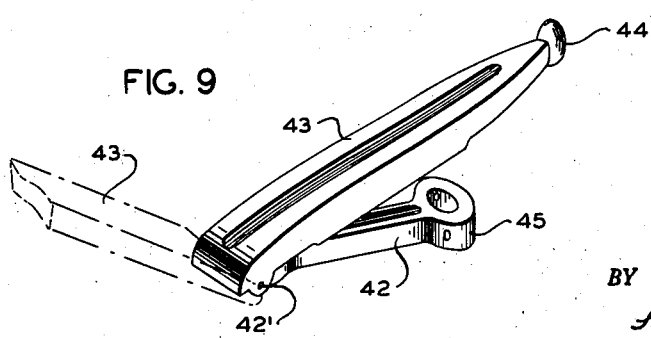
INVENTOR.
J. D. WHEELER
BY
A. Yates Dowell
ATTORNEY Patented May 10, 1949

2,470,061

UNITED STATES PATENT OFFICE 2,470,061

WAGON

John Delbert Wheeler, Detroit, Mich., assignor to American Metalcraft Corporation, Detroit, Mich., a corporation of Michigan Application January 7, 1947, Serial No. 720,627

8 Claims. (Cl. 280—87.01)

This invention relates to vehicles and more particularly to wagons of the type commonly used by children and/or adults for amusement such as coasting, and for transporting various articles of merchandise, or any other desired material within the necessary limits of size and weight.

Heretofore many vehicles of this nature have been proposed which have proved unsatisfactory due to failure to support adequate loads or on the other hand have been so heavy as to preclude their use by smaller children. Many of the prior art vehicles have failed to provide adequate steering apparatus and in very few instances has there been any attempt to provide a spring suspension system resulting in better riding qualities.

It is accordingly an object of this invention to provide a vehicle of light sheet metal construction capable of supporting any reasonable load which might be placed thereon.

It is a further object of this invention to provide a vehicle in which the entire body is a one-piece metal stamping.

It is a further object of this invention to provide a vehicle having a rugged steering mechanism not liable to injury or breakdown and in which the steering action is relatively easy.

It is a further object of this invention to provide a vehicle having a steering and pulling bar of novel construction.

It is a further object of this invention to provide a vehicle having a novel spring suspension resulting in superior riding qualities.

It is a further object of this invention to provide a vehicle in which the axles are held against longitudinal movement by a novel construction of the spring suspension means.

It is a further object of this invention to provide a vehicle in which all parts are enclosed within the sides and ends of the body thus affording maximum protection from damage thereto due to accidents and the like.

It is a further object of this invention to provide a vehicle having front and rear bumpers of novel construction for protection of the vehicle and other objects.

It is a further object of this invention to provide a vehicle the external appearance of which simulates that of an automobile and in which there is provided a simulated instrument panel.

It is a still further object of this invention to provide a vehicle which is relatively simple and economical to construct from a minimum number of parts and with relatively unskilled labor.

Further objects and advantages of this invention will be apparent from the following specification taken in conjunction with the accompanying drawings, wherein:

Fig. 1 is a side elevation of a vehicle constructed in accordance with this invention;

Fig. 2 a top plan view;

Fig. 3 a longitudinal sectional view on the line 3—3 of Figure 2;

Fig. 4 a front elevation;

Fig. 5 a transverse sectional view on the line 5—5 of Fig. 2;

Fig. 6 a transverse sectional view on the line 6—6 of Fig. 2;

Fig. 7 a detail view of the front axle support with parts in section for greater clarity and showing the novel spring suspension;

Fig. 8 a detail view similar to Fig. 7 but showing the rear axle support and spring suspension;

Fig. 9 a detail view in perspective of the handle and steering bar; and

Fig. 10 a fragmentary sectional view on the line 10—10 of Fig. 8.

With reference to the drawings there is shown a vehicle 10 in which the body 11 comprises a shell-like one-piece metal stamping having a general outline simulating the shape of a streamlined automobile. The forward end of the body is provided with a rounded contour and vertical elongated parallel depressions 12 are stamped therein to simulate an automobile radiator grille. These depressions or corrugations also contribute to a great extent to the strength and rigidity of the front portion of the body. Also provided on the rounded forward portion of the body are simulated headlights 13 which may be applied by stenciling or the like but which preferably are applied in the form of decalcomania.

Adjacent the front and rear wheels of the vehicle and in the sides of the body there are provided raised portions 14 and 15 which simulate fender skirts and these portions are decorated to further simulate the appearance of an automobile.

The sides 16 of the body extend downwardly to substantially the mid point of the wheels and terminate in a bead 17 extending completely around the body and serving as a strengthening member.

The rear portion of the body is also provided with a rounded contour and both the front and rear portion are provided with rubber bumpers 18 and 19 secured thereto by concealed rivets, by cement or in other desired manner. These bumpers are provided in order to protect the vehicle from damage in the event of a collision with other objects and also to minimize damage and marring to furniture or other objects with which the vehicle may come in contact.

The inner portion of the shell-like body 11 is of unique construction and provides a dished portion having an upper level 20 and a lower level 21. The upper level 20 provides a clearance beneath the body for a purpose which will presently appear and the lower level 21 provides a suitable seat or platform for the operator of the vehicle or may be used to support various articles of merchandise or other material which it is desired to transport.

Between the upper level 20 and lower level 21 there is provided an inclined portion 22 upon which there is applied, as by a decalcomania 23, a simulation of an automobile instrument panel and on the rear external surface of the body there is provided a simulated license tag 23 which still further renders the likeness to an automobile more realistic.

In the upper level 20 there is provided adjacent the forward end thereof a flanged circular opening 24 in which is rotatably received a tubular member 25. This tubular member is provided midway of its length with a circular bead 26 which rests on the top surface 27 of the flange 24.

Secured to the lower end of the tubular member 25 as by rivets or the like 28 is a yoke 29 formed by a one-piece metal stamping having end portions extending downwardly and outwardly and terminating in axle supporting portions 30.

The upper portion of the member 29 adjacent the tubular member 25 is formed with a flange 28' which contacts the undersurface of the bottom 20 thus providing a thrust bearing supporting the weight of the forward portion of the vehicle and permitting free rotation of the tubular member 25 and member 29.

Provided in the axle supporting portions are vertical slots 31 which slidably receive a transversely extending axle 32 for vertical movement therein. Also provided on the axle supporting member 29 are spring seats 33 having apertures 33' therein for the reception of the extended end portions of coil compression springs 34. The opposite ends of these coil springs 34 are provided with extensions 35 which project through apertures 36 in the axle 32 and serve to hold the axle against endwise movement with respect to the supporting member 29. The engagement of the spring ends 35 with the axle 32 together with the slots 31 serve as the sole means to retain the axle in position on the supporting member 29. The springs 34 provide in effect an individual spring suspension for each end of the axle since each spring is compressed between the spring seat and the axle thus resiliently supporting the body on the axle and in this way results in a vehicle having superior riding qualities.

A rear axle supporting member 37, shown particularly in Fig. 8, is similar to that described above with the exception that mounting holes 38 are provided for the reception of bolts 39 which secure the supporting bracket to the bottom 21 of the vehicle. The spring suspension for the rear axle is identical with that described above in connection with the front axle 32.

Secured to the top of the tubular member 25 by rivets or the like 41 is a forwardly extending channel shaped bar 42, best shown in Fig. 9, to the forward end of which is pivoted at 42' a channel shaped steering lever or handle 43 which terminates in a hand engaging knob 44. As shown in phantom in Fig. 9, the handle 43 may extend forwardly of the bar 42 to provide a convenient means for pulling the vehicle, but when it is desired to use the vehicle as a coaster or the like the handle 44 is folded rearwardly over the bar 42 and the upper end of the tubular member 25 to form a steering handle as best shown in Figs. 1 and 2. The inner surface of the channel shaped handle 43 is so proportioned as to closely engage the sides of the bar 42 and the collar 45 which surrounds the upper end of the tubular member 25 to provide a rigid steering assembly which in effect causes the hand-engaging knob 44 to rotate in an arc about the center of the tubular member 25, thus providing what might be termed concentric steering.

In order to resist rearward movement of the front axle 32 during forward motion of the vehicle or during contact of the wheels with irregular surfaces in the pavement or the like, there is provided a brace 46 secured by a bolt or the like 47 to the under surface of the body member 21. The brace 46 extends forwardly and terminates in a U-shaped portion 48 which is received over the central portion of the axle 32 and is rotatably secured thereto by a rivet or the like 49 extending through an aperture 50 in the axle 32. It is thus seen that the axle and its supporting member 29 may be rotated about the axis of the tubular member 25 to steer the vehicle and still be supported against undesirable rearward movement by the brace 46. Sufficient clearance for movement of the front wheels during steering operations is provided by the upper level 20 of the bottom of the body and in order to further strengthen this portion of the body there is provided a strengthening rib 51 in its upper surface.

Wheels 52 of more or less conventional form are secured on the ends of the front and rear axles in a conventional manner, these wheels being of the roller bearing type and being provided with semi-pneumatic tires in order to further increase the riding qualities of the vehicle. Further description of the details of the wheel structure is considered unnecessary since this structure forms no part of this invention.

It will be noted that the wheels and axles, the spring suspension and all steering mechanism are either enclosed by the body of the vehicle or in the case of the steering bar do not extend beyond the outer surface of the vehicle which is an important factor in that damage to the various parts is held to a minimum since the body will absorb any shock due to impact with other vehicles or objects and thus serve to protect the more vital parts of the vehicle.

The particular construction used results in a relatively strong body which will support any reasonable weight placed thereon without undue deflection and a vehicle having a low center of gravity which assures safe and stable operation at relatively high speeds.

The unique design of this vehicle also permits substantially all of the parts to be made more or less by simple stamping operations which results in an extremely economical construction and in a vehicle which may be manufactured and assembled by comparatively unskilled labor.

It will be obvious to those skilled in the art that various changes may be made in the invention without departing from the spirit and scope thereof and therefore the invention is not limited by that which is shown in the drawing and described in the specification but only as indicated in the appended claims.

What is claimed is:

1. In a vehicle a body comprising a shell-like structure having an outer portion forming substantially upright sides and ends thereof, the upper part of said outer portion being curved gradually inwardly and defining an inner side wall and a substantially horizontally disposed intermediate load supporting portion located at an elevation between the top and the bottom of said outer portion with front and rear sections of said load supporting portion disposed at different elevations and providing a corresponding difference in clearance therebeneath, the section of said intermediate load supporting portion disposed at the higher elevation having a post receiving opening, an axle carrying member fastened beneath each of said front and rear sections, elongated slots in said axle carrying members adjacent the ends thereof, an axle received in the elongated slots of each axle carrying member, wheels rotatably mounted on said axles adjacent the outer ends thereof, spring seats formed in said axle carrying members, apertures formed in each spring seat, apertures in said axles located opposite the apertures in said spring seats, compression spring means extending between said spring seats and said axles, means on the ends of each spring extending into the apertures in said spring seats and the apertures in said axles whereby each axle is resiliently supported adjacent the ends thereof and axial movement of each axle relative to its associated axle carrying member is prevented, and a post in said receiving opening rotatably mounting one of said axle carrying members beneath the section affording the greater clearance.

2. In a vehicle a body comprising a one-piece metal shell-like structure simulating an automobile said body having an outer portion forming substantially upright sides and ends thereof said outer portion being provided with a reinforced lower edge, resilient bumper members secured to said reinforced lower edge at the front and rear of said body, the upper part of said outer portion being curved gradually inwardly and defining an inner side wall and a substantially horizontally disposed intermediate load supporting portion located at an elevation between the top and the bottom of said outer portion with front and rear sections of said load supporting portion disposed at different elevations and providing a corresponding difference in clearance therebeneath the section of said intermediate load supporting portion disposed at the higher elevation having a post receiving opening, an inclined flat portion connecting said load supporting portions and a simulated instrument panel on the inner surface of said inclined flat portion, corrugations or depressions provided in said outer portion at the front of said body and constructed and arranged to reinforce said body and simulate a radiator grille, an axle carrying member fastened beneath each of said front and rear sections, an axle carried by each of said axle carrying members, wheels rotatably mounted on said axles adjacent the outer ends thereof, a tubular post in said receiving opening rotatably mounting one of said axle carrying members beneath the section affording the greater clearance, steering and pulling means secured to the upper end of said tubular post, said wheels and associated axle supports being enclosed within said outer portion whereby damage due to collision or the like is minimized.

3. A vehicle body comprising a shell-like structure having an outer portion forming substantially upright sides and ends thereof said outer portion being provided with a reinforced lower edge, resilient bumper members secured to said reinforced lower edge at the front and rear of said body, the upper part of said outer portion being curved gradually inwardly and defining an inner side wall and a substantially horizontally disposed intermediate load supporting portion located at an elevation between the top and the bottom of said outer portion with front and rear sections of said load supporting portion disposed at different elevations and providing a corresponding difference in clearance therebeneath the section of said intermediate load supporting portion disposed at the higher elevation having a post receiving opening, said outer portion at the front of said body being provided with corrugations or depressions constructed and arranged to reinforce the front section of said body and to simulate a radiator grille, an axle carrying member fastened beneath each of said front and rear sections, and a tubular post in said receiving opening rotatably mounting one of said axle carrying members beneath the section affording the greater clearance.

4. A vehicle body comprising a shell-like structure having an outer portion forming substantially upright sides and ends thereof said outer portion being provided with a reinforced lower edge, resilient bumper members secured to said lower edge at the front and rear of said body, the upper part of said outer portion being curved gradually inwardly and defining an inner side wall and a substantially horizontally disposed intermediate load supporting portion located at an elevation between the top and the bottom of said outer portion with front and rear sections of said load supporting portion disposed at different elevations and providing a corresponding difference in clearance therebeneath the section of said intermediate load supporting portion disposed at the higher elevation having a post receiving opening, an axle carrying member fastened beneath each of said front and rear sections, and a post in said receiving opening rotatably mounting one of said axle carrying members beneath the section affording the greater clearance.

5. A vehicle body comprising a shell-like structure having an outer portion forming substantially upright sides and ends thereof, the upper part of said outer portion being curved gradually inwardly and defining an inner side wall and a substantially horizontally disposed intermediate load supporting portion located at an elevation between the top and bottom of said outer portion with front and rear sections of said load supporting portion disposed at different elevations and providing a corresponding difference in clearance therebeneath, the section of said intermediate load supporting portion disposed at the higher elevation having a post receiving opening, an axle carrying member fastened beneath each of said front and rear sections, and a post in said receiving opening rotatably mounting one of said axle carrying members beneath the section affording the greater clearance.

6. Spring suspension means for a vehicle comprising an axle support, elongated slots in said axle support adjacent the ends thereof, an axle received in said elongated slots, spring seats formed in said axle support, apertures formed in each spring seat, apertures in said axle located opposite the apertures in said spring seats, compression spring means extending between said spring seats and said axle, means on the ends of each spring integral therewith and extending axially thereof into the apertures in said spring seats and the apertures in said axle whereby said axle is resiliently supported and axial movement thereof relative to said axle support is substantially prevented.

7. Steering and pulling means for a vehicle comprising a channel shaped bar secured at one end to a tubular portion rotatably received in an aperture in said vehicle and operatively connected to the front wheels of said vehicle, a second channel shaped bar pivotally mounted on the opposite end of said first mentioned bar, said second bar terminating in a hand-engaging knob, said second bar when in pulling position forming substantially an extension of said first bar, said second bar when in steering position being folded over said first bar in nesting relation thereto whereby during steering movements said hand-engaging knob moves in an arc concentric to the fixed end of said first mentioned bar.

8. Steering and pulling means for a vehicle comprising a tubular post rotatably received in a flanged opening in said vehicle, a bead on said post engaging said flange whereby downward movement of said post is prevented, ground engaging wheels secured to the lower end of said post, a channel shaped bar secured at one end to the upper end of said post, a second channel shaped bar pivotally mounted on the opposite end of said first mentioned bar, said second bar terminating in a hand engaging knob, said second bar when in pulling position forming substantially an extension of said first bar, said second bar when in steering position being folded over said first bar in nesting relation thereto whereby during steering movements, said hand engaging knob moves in an arc concentric to the fixed end of said first mentioned bar.

JOHN DELBERT WHEELER.

REFERENCES CITED

The following references are of record in the file of this patent:

UNITED STATES PATENTS

| Number | Name | Date |
|---|---|---|
| 1,468,175 | Sherwood | Sept. 18, 1923 |
| 1,509,181 | Sherwood | Sept. 23, 1924 |
| 1,627,022 | Erni | May 3, 1927 |
| 1,665,729 | Carlson | Apr. 10, 1928 |
| 2,027,522 | Eck | Jan. 14, 1936 |
| 2,080,922 | Kraeft | May 18, 1937 |
| 2,127,104 | Bucklin | Aug. 16, 1938 |
| 2,266,752 | Gottfried | Dec. 23, 1941 |